United States Patent
Tadakuma et al.

(10) Patent No.: US 11,905,037 B2
(45) Date of Patent: Feb. 20, 2024

(54) AERIAL VEHICLE TAKEOFF AND LANDING SYSTEM, AERIAL VEHICLE TAKEOFF AND LANDING APPARATUS, AND AERIAL VEHICLE

(71) Applicants: TOHOKU UNIVERSITY, Sendai (JP); NPO International Rescue System Institute, Kobe (JP)

(72) Inventors: Kenjiro Tadakuma, Sendai (JP); Satoshi Tadokoro, Sendai (JP); Kazunori Ohno, Sendai (JP); Yoshito Okada, Sendai (JP); Masahiro Watanabe, Sendai (JP); Daiki Fujikura, Sendai (JP); Toshi Takamori, Kobe (JP)

(73) Assignees: TOHOKU UNIVERSITY, Sendai (JP); NPO INTERNATIONAL RESCUE SYSTEM INSTITUTE, Kobe (JP)

( * ) Notice: Subject to any disclaimer, the term of this patent is extended or adjusted under 35 U.S.C. 154(b) by 149 days.

(21) Appl. No.: 17/632,115

(22) PCT Filed: Jul. 31, 2020

(86) PCT No.: PCT/JP2020/029415
§ 371 (c)(1),
(2) Date: Feb. 1, 2022

(87) PCT Pub. No.: WO2021/029233
PCT Pub. Date: Feb. 18, 2021

(65) Prior Publication Data
US 2022/0274719 A1  Sep. 1, 2022

(30) Foreign Application Priority Data
Aug. 9, 2019  (JP) ................. 2019-147748

(51) Int. Cl.
*B64F 1/02* (2006.01)
*B64U 70/00* (2023.01)
(Continued)

(52) U.S. Cl.
CPC .............. *B64F 1/22* (2013.01); *B64C 39/024* (2013.01); *B64F 1/02* (2013.01); *B64U 10/13* (2023.01);
(Continued)

(58) Field of Classification Search
CPC .................................. B64F 1/02; B64U 70/30
See application file for complete search history.

(56) References Cited

U.S. PATENT DOCUMENTS 2,488,050 A * 11/1949 Brodie ...................... B64F 1/04
244/110 F
3,163,380 A  12/1964 Brodie
(Continued)

FOREIGN PATENT DOCUMENTS

CN  204341412 U  5/2015
CN  107187450 A  9/2017
(Continued)

OTHER PUBLICATIONS

Aug. 1, 2022 Extended Search Report issued in European Patent Application No. 20853296.0.
(Continued)

*Primary Examiner* — Christopher P Ellis
(74) *Attorney, Agent, or Firm* — Oliff PLC

(57) ABSTRACT

An aerial vehicle takeoff and landing system, an aerial vehicle takeoff and landing apparatus, and an aerial vehicle capable of reducing the influence of the ground effect and capable of taking off and landing smoothly even in a comparatively small and limited space. A pair of rails are arranged side by side with a gap therebetween, and are
(Continued)

arranged with a space in an extension direction on at least an under side and one end side. An aerial vehicle has a suspension portion provided at an upper portion thereof so as to be inserted between the rails from the one end side. With the suspension portion is inserted between the rails, the aerial vehicle can be suspended at a predetermined landing position of the rails, and the aerial vehicle suspended at the landing position can take off.

17 Claims, 9 Drawing Sheets

(51) Int. Cl.
    B64F 1/22      (2006.01)
    B64C 39/02    (2023.01)
    *B64U 10/13*       (2023.01)
    *B64U 80/82*       (2023.01)
    *B64U 80/84*       (2023.01)
    *B64U 80/86*       (2023.01)
    *B64U 101/60*     (2023.01)

(52) U.S. Cl.
    CPC .............. *B64U 70/00* (2023.01); *B64U 80/82* (2023.01); *B64U 80/84* (2023.01); *B64U 80/86* (2023.01); *B64U 2101/60* (2023.01); *B64U 2201/10* (2023.01); *B64U 2201/20* (2023.01)

(56) References Cited

U.S. PATENT DOCUMENTS

| | | | |
|---|---|---|---|
| 7,232,092 B2 * | 6/2007 | Yamamoto | B64G 5/00 244/63 |
| 9,010,683 B2 | 4/2015 | Gundlach et al. | |
| 11,608,192 B2 * | 3/2023 | Leone | B64C 39/024 |
| 2019/0144007 A1 * | 5/2019 | Lum | B61B 3/02 105/150 |
| 2019/0161190 A1 * | 5/2019 | Gil | B65G 1/0435 |
| 2019/0193952 A1 | 6/2019 | Zevenbergen et al. | |
| 2022/0033074 A1 * | 2/2022 | McNish | B64C 39/024 |
| 2022/0258883 A1 * | 8/2022 | Im | B64G 5/00 |
| 2022/0306284 A1 * | 9/2022 | Howe | B64F 1/125 |
| 2022/0306320 A1 * | 9/2022 | Howe | B64F 1/125 |

FOREIGN PATENT DOCUMENTS

| | | | | |
|---|---|---|---|---|
| CN | 108466703 A | | 8/2018 | |
| CN | 108466703 A | * | 8/2018 | ............ B63B 35/50 |
| CN | 110001956 A | | 7/2019 | |
| CN | 114013674 A | * | 2/2022 | |
| DE | 102020100071 A1 | * | 7/2021 | |
| EP | 3514070 A1 | * | 7/2019 | ............ B64C 39/024 |
| EP | 3680181 A1 | * | 7/2020 | ............ B64C 25/68 |
| EP | 3770066 A1 | * | 1/2021 | ............ B64C 13/02 |
| FR | 3097207 A1 | * | 12/2020 | ............ B64C 39/024 |
| JP | H08-34398 A | | 2/1996 | |
| JP | 2014-40186 A | | 3/2014 | |
| JP | 2014040186 A | * | 3/2014 | |
| JP | 2018-190362 A | | 11/2018 | |
| JP | 2019-089461 A | | 6/2019 | |
| JP | 2022097298 A | * | 6/2022 | |
| WO | 2013/112206 A1 | | 8/2013 | |
| WO | 2021/176914 A1 | | 9/2021 | |

OTHER PUBLICATIONS

Oct. 13, 2020 Search Report issued in International Patent Application No. PCT/JP2020/029415.
Sep. 4, 2023 Office Action issued in Chinese Patent Application No. 202080056633.8.

* cited by examiner (a)

(b)

(a)

(b)

(a)

(b)

(c)

AERIAL VEHICLE TAKEOFF AND LANDING SYSTEM, AERIAL VEHICLE TAKEOFF AND LANDING APPARATUS, AND AERIAL VEHICLE

FIELD OF THE INVENTION

The present invention relates to an aerial vehicle takeoff and landing system, an aerial vehicle takeoff and landing apparatus, and an aerial vehicle.

DESCRIPTION OF RELATED ART

Conventionally, an aerial vehicle 51 such as a drone or an unmanned aerial vehicle provided so as to be able to fly by remote control or automatic control generally takes off and lands on a plane such as, for example, a dedicated landing platform 52 as shown in FIG. 10, the ground, the upper surface of a vehicle, the rooftop of a building, or the like (see, for example, Patent Literature 1 or 2). The aerial vehicle 51 can be used for various purposes, and for example, as shown in FIG. 10, a luggage 53 can be attached to an under portion thereof and used to carry the luggage 53.

In addition, as a system for capturing and landing an aerial vehicle in the air, a system including a rail suspended horizontally by a crane with respect to an aerial vehicle having an arm attached so as to extend upward, the arm having a hook at a distal end thereof, a shuttle provided so as to be movable along the rail, and a cable suspended from the shuttle and stretched to extend in a direction perpendicular to the rail is known (see, for example, Patent Literature 3). In this system, the aerial vehicle flies along the rail below the rail, and the arm of the aerial vehicle hits the cable. As the aerial vehicle moves, the position where the arm hits the cable shifts to the upper portion of the arm, and the hook is caught at the cable so that the aerial vehicle is captured.

CITATION LIST

Patent Literature 1: Japanese Unexamined Patent Publication No. 2019-089461
Patent Literature 2: Japanese Unexamined Patent Publication No. 2018-190362
Patent Literature 3: U.S. Pat. No. 9,010,683

SUMMARY OF THE INVENTION

However, in a general aerial vehicle that takes off and lands on a plane as described in Patent Literatures 1 and 2, there is a risk that control becomes unstable or the aerial vehicle falls due to the so-called ground effect, so that there is a problem that it takes time to land. In addition, there is a problem that a sufficiently large space is required for safe takeoff and landing. In the system described in Patent Literature 3, since the aerial vehicle cannot take off in the landing state, it is necessary to temporarily disconnect the hook of the aerial vehicle from the cable or reset the aerial vehicle to a state in which it can take off. Thus, there is a problem that smooth takeoff is difficult.

The present invention has been made in view of such a problem, and an object thereof is to provide an aerial vehicle takeoff and landing system, an aerial vehicle takeoff and landing apparatus, and an aerial vehicle capable of reducing the influence of the ground effect and capable of smoothly taking off and landing even in a relatively small and limited space.

In order to achieve the above object, an aerial vehicle takeoff and landing system according to the present invention includes: a pair of rails arranged side by side with a gap therebetween and arranged with a space in an extension direction on at least an under side and one end side; and an aerial vehicle having a suspension portion provided at an upper portion thereof so as to be inserted between the rails from the one end side, wherein with the suspension portion inserted between the rails, the aerial vehicle can be suspended at a predetermined landing position of the rails, and the aerial vehicle suspended at the landing position can take off.

An aerial vehicle takeoff and landing apparatus according to the present invention is an aerial vehicle takeoff and landing apparatus for landing an aerial vehicle, including: a pair of rails arranged side by side with a gap therebetween and arranged with a space in an extension direction on at least an under side and one end side, the aerial vehicle having a suspension portion provided at an upper portion thereof so as to be inserted between the rails from the one end side, wherein with the suspension portion inserted between the rails, the aerial vehicle can be suspended at a predetermined landing position of the rails, and the aerial vehicle suspended at the landing position can take off.

An aerial vehicle according to the present invention is an aerial vehicle that takes off and lands using a pair of rails, including: a suspension portion at an upper portion thereof, the rails being arranged side by side with a gap therebetween and arranged with a space in an extension direction on at least an under side and one end side, the suspension portion being provided so as to be inserted between the rails from the one end side, wherein with the suspension portion inserted between the rails, the aerial vehicle can be suspended at a predetermined landing position of the rails, and the aerial vehicle suspended at the landing position can take off.

The aerial vehicle takeoff and landing system according to the present invention can be configured by combining the aerial vehicle takeoff and landing apparatus according to the present invention and the aerial vehicle according to the present invention. At this time, the rails of the aerial vehicle takeoff and landing apparatus according to the present invention correspond to the rails of the aerial vehicle takeoff and landing system according to the present invention, and the aerial vehicle according to the present invention corresponds to the aerial vehicle of the aerial vehicle takeoff and landing system according to the present invention. Therefore, the aerial vehicle takeoff and landing apparatus according to the present invention and the aerial vehicle according to the present invention have the effects of the corresponding configurations of the aerial vehicle takeoff and landing system according to the present invention as shown below.

In the aerial vehicle takeoff and landing system according to the present invention, it is preferable that the aerial vehicle is one provided so as to be able to fly by remote control or automatic control, for example, a drone or an unmanned aerial vehicle. The aerial vehicle takeoff and landing system according to the present invention can take off and land an aerial vehicle as follows. That is, when landing, the aerial vehicle flies from one end side of a pair of rails arranged with a space in an extension direction on at least an under side and one end side toward the under side of the rails, and the suspension portion provided on the upper portion of the aerial vehicle is inserted between the rails from one end side of the rails. By moving the aerial vehicle to the landing position of the rails with the suspension portion inserted between the rails, the aerial vehicle can be suspended and landed. At this time, by arranging the rails so that there is sufficient space below the aerial vehicle, the influence of the ground effect can be reduced to be almost negligible. In addition, since there is almost no effect of the ground effect, the aerial vehicle can land stably even in a relatively small and limited space.

When taking off, the aerial vehicle flies along the rails from the state of being suspended at the landing position, whereby the suspension portion can be pulled out from between the rails and the aerial vehicle can take off. As described above, the aerial vehicle takeoff and landing system according to the present invention can smoothly take off and land the aerial vehicle.

In the aerial vehicle takeoff and landing system according to the present invention, the aerial vehicle can easily move to the landing position along the rails by inserting the suspension portion between the rails from one end side with the urging force of the aerial vehicle during the insertion or with the force applied to the aerial vehicle from one end side of the rail body toward the other end side. Therefore, after the suspension portion is inserted between the rails, fine flight control is not required, and in some cases, it is possible to stop a propulsion means such as a propeller of the aerial vehicle.

In the aerial vehicle takeoff and landing system according to the present invention, the rails may be installed in any place as long as a space can be created in the extension direction on at least the under side and one end side. The rails may be installed on the ceiling or under the eaves of a factory, a house, a building, or the like, or may be suspended by a crane or the like. The landing position of the rails may be a predetermined point, or may be a range of a predetermined length along the length direction of the rails. The aerial vehicle does not necessarily have to stop at the landing position.

The aerial vehicle takeoff and landing system according to the present invention can be suitably used, for example, when a luggage or the like is attached to the lower portion of the aerial vehicle and carried. When the aerial vehicle is suspended at the landing position, since there is a space under the aerial vehicle, the work of attaching a luggage to the lower portion of the aerial vehicle or unloading the luggage attached to the lower portion of the aerial vehicle can be easily performed. At this time, for example, by installing a belt conveyor below the aerial vehicle suspended at the landing position, the luggage unloaded sequentially from the aerial vehicles coming one after another can be conveyed by the belt conveyor. Moreover, the luggage conveyed by the belt conveyor can be sequentially attached to the lower portions of the aerial vehicles and be carried by the individual aerial vehicles.

In the aerial vehicle takeoff and landing system according to the present invention, the aerial vehicle suspended at the landing position may be configured to be able to take off from the one end side. In the aerial vehicle takeoff and landing system according to the present invention, the rails may be arranged with a space in the extension direction on the other end side so that the aerial vehicle suspended at the landing position can take off from the other end side. In this case, since the direction in which the aerial vehicle enters the rails at the time of landing and the direction in which the aerial vehicle exits the rails at the time of takeoff are different, the aerial vehicles landing one after another can take off in order, and a plurality of aerial vehicles can take off and land in succession.

In the aerial vehicle takeoff and landing system according to the present invention, the rails may be arranged at intervals in the vertical direction, but it is preferable that the rails are arranged at intervals in the left-right direction. Further, the aerial vehicle takeoff and landing system according to the present invention may include a pair of side walls provided so as to extend upward along the outer side edges of the rails and a ceiling portion provided by connecting the upper portions of the side walls so as to cover the upper portions of the rails. In this case, the rails can be integrated with the side walls and the ceiling portion. The upper surfaces of the rails and the suspension portion inserted between the rails can be protected by the side walls and the ceiling portion.

In the aerial vehicle takeoff and landing system according to the present invention, it is preferable that the rails are provided so that the distance between the rails increases from the landing position toward the one end side. In this case, the suspension portion of the aerial vehicle can be easily inserted between the rails, and the aerial vehicle can be landed more smoothly.

The aerial vehicle takeoff and landing system according to the present invention may have a guiding means provided on the one end side of the rails so as to guide the suspension portion from the one end side to between the rails. In this case as well, the guiding means makes it easy to insert the suspension portion of the aerial vehicle between the rails, so that the aerial vehicle can land more smoothly.

In the aerial vehicle takeoff and landing system according to the present invention, the suspension portion may have an arm provided so as to extend upward from the aerial vehicle and an engagement portion provided at a distal end of the arm so as to be movable in a state of being inserted between the rails and be able to engage between the rails at the landing position. In this case, the aerial vehicle can be suspended by engaging the engagement portion between the rails at the landing position. The engagement portion may be configured to engage between the rails in any configuration as long as the aerial vehicle can be suspended. The engagement portion may be formed of, for example, a hook provided so as to engage with by hooking on one rail or both rails, and may be formed of a roller provided so as to travel on the upper surface of one rail or both rails, and may be configured to engage with by being attached to one rail or both rails by magnetic force.

In this case, the arm may be provided so as to be deformable between a protruding state of extending toward an upper side of the aerial vehicle and a retracted state in which an amount of protrusion toward the upper side from the aerial vehicle is smaller than that of the protruding state. By putting the arm into the protruding state during landing, it is possible to facilitate landing. In addition, by putting the arm in the retracted state during flight, it is possible to prevent the suspension portion from colliding with or being caught at something during flight. The arm may be configured to extend and contract along the vertical direction of the aerial vehicle, for example, or may be attached to the upper portion of the aerial vehicle so as to be rotatable about a horizontal axis.

According to the present invention, it is possible to provide an aerial vehicle takeoff and landing system, an aerial vehicle takeoff and landing apparatus, and an aerial vehicle capable of reducing the influence of the ground effect and capable of taking off and landing smoothly even in a comparatively small and limited space.

DETAILED DESCRIPTION OF THE INVENTION

Hereinafter, embodiments of the present invention will be described with reference to the drawings.

FIGS. 1 to 9 show an aerial vehicle takeoff and landing system, an aerial vehicle takeoff and landing apparatus, and an aerial vehicle according to an embodiment of the present invention.

Figure 1:
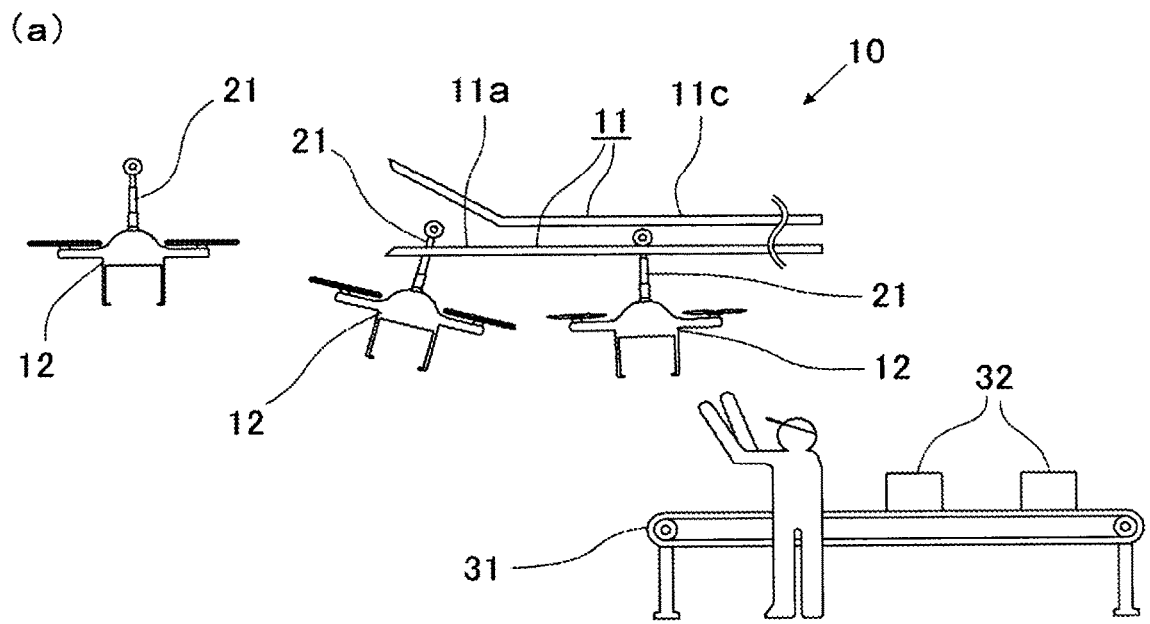
FIGS. 1A and 1B are a side view and a front view, respectively, showing a state of use of an aerial vehicle takeoff and landing system according to an embodiment of the present invention, in which the side wall of a rail body is omitted.
Figure 1:
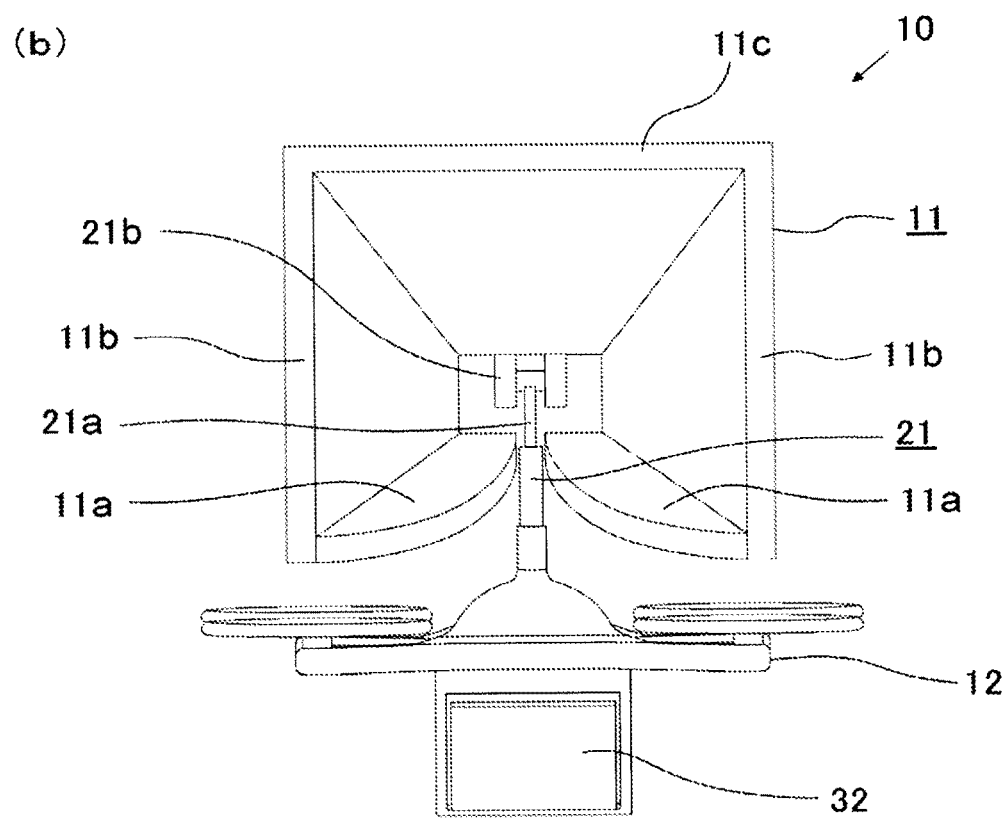

As shown in FIG. 1, an aerial vehicle takeoff and landing system 10 according to the embodiment of the present invention has a rail body 11, a pair of side walls, a ceiling portion, and an aerial vehicle 12.

As shown in FIGS. 1A and 1B, the rail body 11 is elongated and is installed for example, on the ceiling or under the eaves of a factory, a house, or a building with a space in an extension direction on at least an under side and one end side. The rail body 11 has a pair of rails 11a, a pair of side walls 11b, and a ceiling portion 11c. The rail body 11 is formed by integrating the rails 11a together with the side walls 11b and the ceiling portion 11c. The rails 11a are arranged side by side with a space therebetween in the left-right direction. The side walls 11b are provided so as to extend upward along the outer side edges of the rails 11a.

The ceiling portion 11c is provided by connecting the upper portions of the side walls 11b so as to cover the upper portions of the rails 11a.

The rail body 11 is arranged so that the distance between the rails 11a gradually narrows from one end side toward the center portion, and the same distance is maintained from the middle to the other end side. The rail body 11 is provided with a landing position of the aerial vehicle 12 within a range of a predetermined point or a predetermined length within a range of maintaining the same distance between the rails 11a. As a result, the rails 11a are provided so that the distance between the rails increases from the landing position toward one end side. The rail body 11 may be installed in any place as long as a space can be created in the extension direction on at least the under side and one end side. The rail body 11 forms an aerial vehicle takeoff and landing apparatus for landing the aerial vehicle 12.

Figure 2:
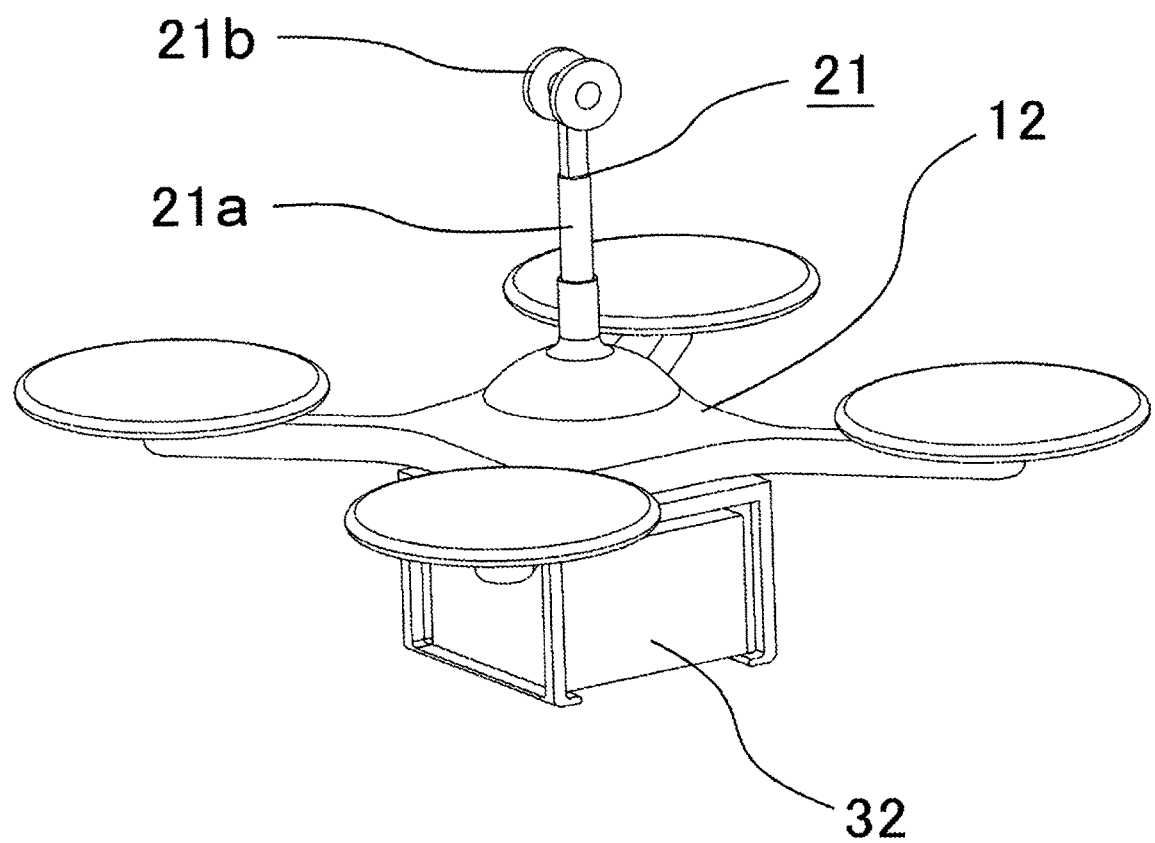
FIG. 2 is a perspective view showing an aerial vehicle of the aerial vehicle takeoff and landing system according to the embodiment of the present invention.

As shown in FIGS. 1 and 2, the aerial vehicle 12 has a suspension portion 21 provided at an upper portion thereof so as to extend upward. The suspension portion 21 has an arm 21a provided so as to extend upward from the aerial vehicle 12 and an engagement portion 21b provided at the distal end of the arm 21a. The engagement portion 21b is formed of a pair of rollers provided on both the left and right sides of the distal end of the arm 21a so as to be rotatable about an axis perpendicular to the extension direction of the arm 21a. The suspension portion 21 is configured to be movable between the rails 11a in such a way that the arm 21a is inserted between the rails 11a from one end side of the rail body 11, the rollers of the engagement portion 21b are inserted into and engage with the inside of the rail body 11, and the rollers rotate and travel along the upper surfaces of the left and right rails 11a. The suspension portion 21 is configured to be movable to the landing position of the rail body 11 and be stopped between the rails 11a at the landing position. As a result, the aerial vehicle 12 is configured so that it can be suspended at a predetermined landing position of the rail body 11 with the suspension portion 21 inserted between the rails 11a, and can take off from the state of being suspended at the landing position.

In the example shown in FIGS. 1 and 2, the aerial vehicle 12 is a drone, but may be any flying object such as an unmanned aerial vehicle. The aerial vehicle 12 may be able to fly by remote control or may be able to fly by automatic control. The engagement portion 21b is formed of a pair of rollers, but may be configured to engage with the rail body 11 in any configuration as long as the aerial vehicle 12 can be suspended. The engagement portion 21b may be formed of, for example, a hook provided to be engageable with the rail body 11 by hooking thereon and may configure to be engageable with the rail body 11 by being attached thereto by magnetic force.

Next, the operation will be described.

The aerial vehicle takeoff and landing system 10 can take off and land the aerial vehicle 12 as follows. That is, when landing, the aerial vehicle 12 flies from one end side of the rail body 11 toward the under side of the rail body 11, and the arm 21a provided on the upper portion of the aerial vehicle 12 is inserted between the rails 11a from one end side of the rail body 11, and the rollers of the engagement portion 21b are inserted into the rail body 11 from one end side of the rail body 11. At this time, since the distance on one end side of the rails 11a is widened, it is easy to insert the arm 21a of the aerial vehicle 12 between the rails 11a. By moving the aerial vehicle 12 to the landing position of the rail body 11 with the engagement portion 21b inserted inside the rail body 11, the aerial vehicle 12 can be suspended and landed. At this time, by arranging the rail body 11 so that a sufficient space is provided below the aerial vehicle 12, the influence of the ground effect can be reduced to be almost negligible. Further, since there is almost no influence of the ground effect, the aerial vehicle 12 can be stably landed even in a relatively small and limited space.

When taking off, the aerial vehicle 12 is moved along the rail body 11 toward one end side of the rail body 11 in the state of being suspended at the landing position whereby the suspension portion 21 can be pulled out from between the rails 11a and the aerial vehicle 12 can take off. In this way, the aerial vehicle takeoff and landing system 10 can smoothly take off and land the aerial vehicle 12.

In the aerial vehicle takeoff and landing system 10, the aerial vehicle 12 can easily move to the landing position along the rail body 11 by inserting the suspension portion 21 between the rails 11a from one end side only with the urging force of the aerial vehicle 12 during the insertion or only with the force applied to the aerial vehicle 12 from one end side of the rail body 11 toward the other end side. Therefore, after the engagement portion 21b is inserted into the rail body 11, fine flight control is not required, and it is possible to stop a propulsion means such as a propeller of the aerial vehicle 12.

As shown in FIGS. 1 and 2, the aerial vehicle takeoff and landing system 10 can be suitably used, for example, when a luggage or the like is attached to the lower portion of the aerial vehicle 12 and carried. When the aerial vehicle 12 is suspended at the landing position, since there is a space under the aerial vehicle 12, the work of attaching a luggage to the lower portion of the aerial vehicle 12 or unloading the luggage attached to the lower portion of the aerial vehicle 12 can be easily performed. At this time, for example, as shown in FIG. 1A, by installing a belt conveyor 31 below the aerial vehicle 12 suspended at the landing position, the luggage 32 unloaded sequentially from the aerial vehicles 12 coming one after another can be conveyed by the belt conveyor 32. Moreover, the luggage 32 conveyed by the belt conveyor 31 can be sequentially attached to the lower portions of the aerial vehicles 12 and be carried by the individual aerial vehicles 12.

Figure 3:
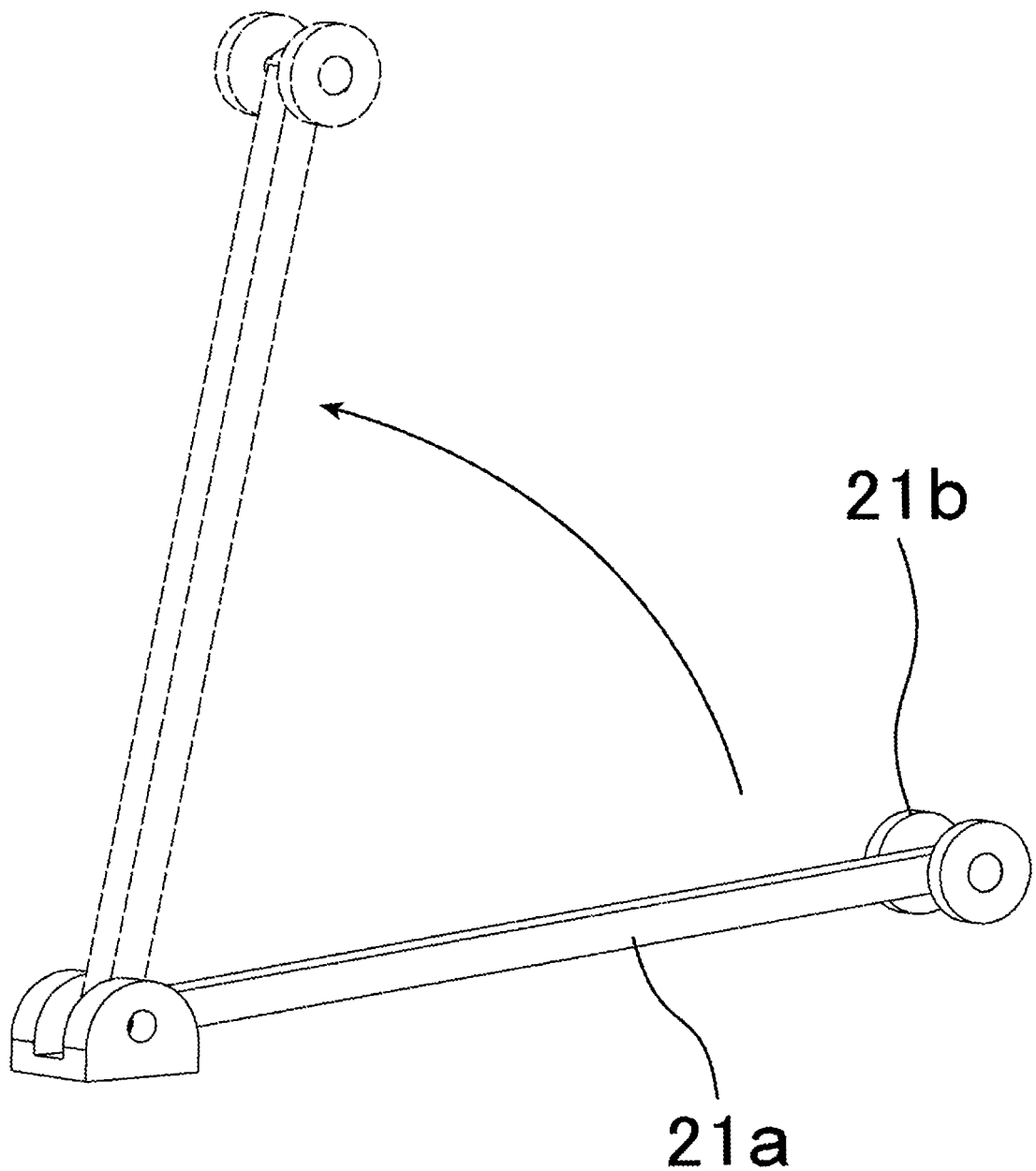
FIG. 3 is a perspective view showing a modified example of an arm of the aerial vehicle of the aerial vehicle takeoff and landing system according to the embodiment of the present invention.

In the aerial vehicle takeoff and landing system 10, the arm 21a of the aerial vehicle 12 may have a telescopic structure that slides in the length direction along the vertical direction of the aerial vehicle 12 and extends and contracts, and may be configured to be deformable between a protruding state of extending toward the upper side of the aerial vehicle 12 and a retracted state in which the amount of protrusion toward the upper side from the aerial vehicle 12 is smaller than that of the protruding state. As shown in FIG. 3, the arm 21a may be attached to the upper portion of the aerial vehicle 12 so as to be rotatable about a horizontal axis, and may be configured such that by rotating the arm 21a, the arm 21a is deformed between a protruding state of extending toward the upper side of the aerial vehicle 12 and a retracted state in which the amount of protrusion toward the upper side from the aerial vehicle 12 is smaller than that of the protruding state. In these cases, it is possible to facilitate landing by putting the arm 21a into the protruding state at the time of landing. Further, by putting the arm 21a into the retracted state during flight, it is possible to prevent the suspension portion 21 from colliding with or being caught at something during flight.

The rail body 11 may be arranged with a space in the extension direction on the other end side, and the aerial vehicle 12 suspended at the landing position may be configured to be able to take off from the other end side. In this case, since the direction in which the aerial vehicle 12 enters the rail body 11 at the time of landing and the direction in which the aerial vehicle 12 exits the rail body 11 at the time of takeoff are different, the aerial vehicles 12 landing one after another can take off in order, and a plurality of aerial vehicles 12 can take off and land in succession.

Figure 4:
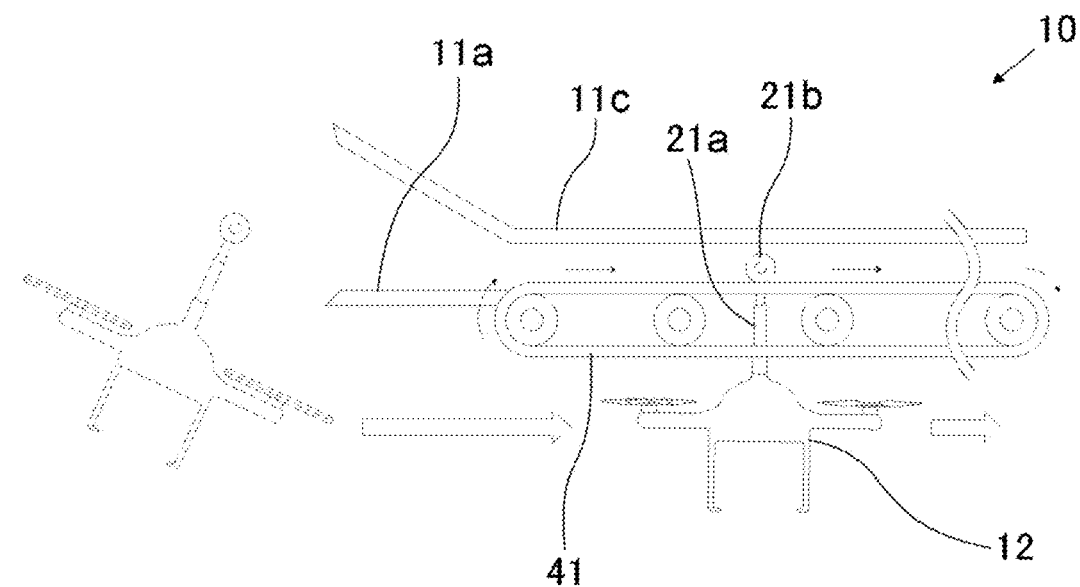
FIG. 4 is a side view showing a modified example in which the aerial vehicle takeoff and landing system according to the embodiment of the present invention has a transport means, in which the side wall of the rail body is omitted.

As shown in FIG. 4, the aerial vehicle takeoff and landing system 10 may include a transport means 41 provided in the rail body 11 so as to allow the aerial vehicle 12 having the engagement portion 21b inserted into the rail body 11 to move along the rail body 11. In this case, the aerial vehicle 12 can be moved toward the other end side of the rail body 11 in a stopped state, and for example, luggage can be loaded and unloaded during the movement. The transport means 41 may be, for example, any of a belt conveyor shown in FIG. 4, a plurality of active wheels, a plurality of rotating bodies having irregularities on the surface, a transport means by vibration, a transport means by wave feed transport, and the like. When the transport means 41 is formed of the belt conveyor shown in FIG. 4, protrusions are provided on the belt at predetermined intervals, and only one aerial vehicle 12 is arranged between the protrusions, so that the aerial vehicles 12 adjacent to each other during transport can be prevented from coming into contact with each other. In addition to such transport means, the rollers of the engagement portion 21b of the aerial vehicle 12 may be formed of active wheels and may be self-propelled.

Figure 5:
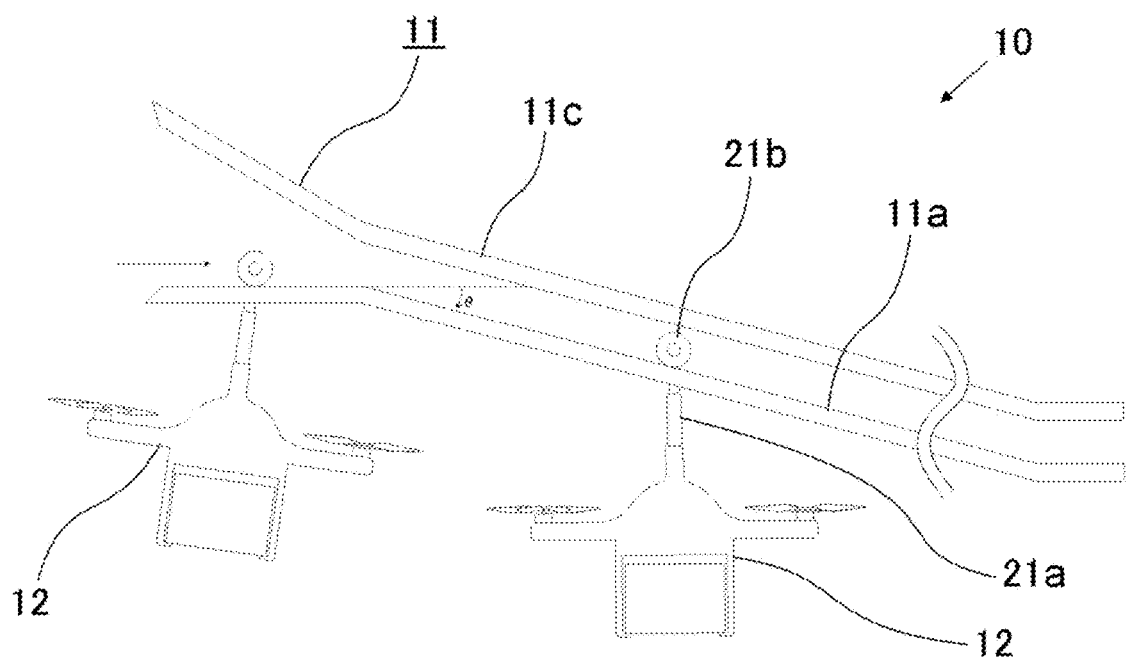
FIG. 5 is a side view showing a modified example in which the rail body of the aerial vehicle takeoff and landing system according to the embodiment of the present invention is tilted, in which the side wall of the rail body is omitted.
Figure 6:
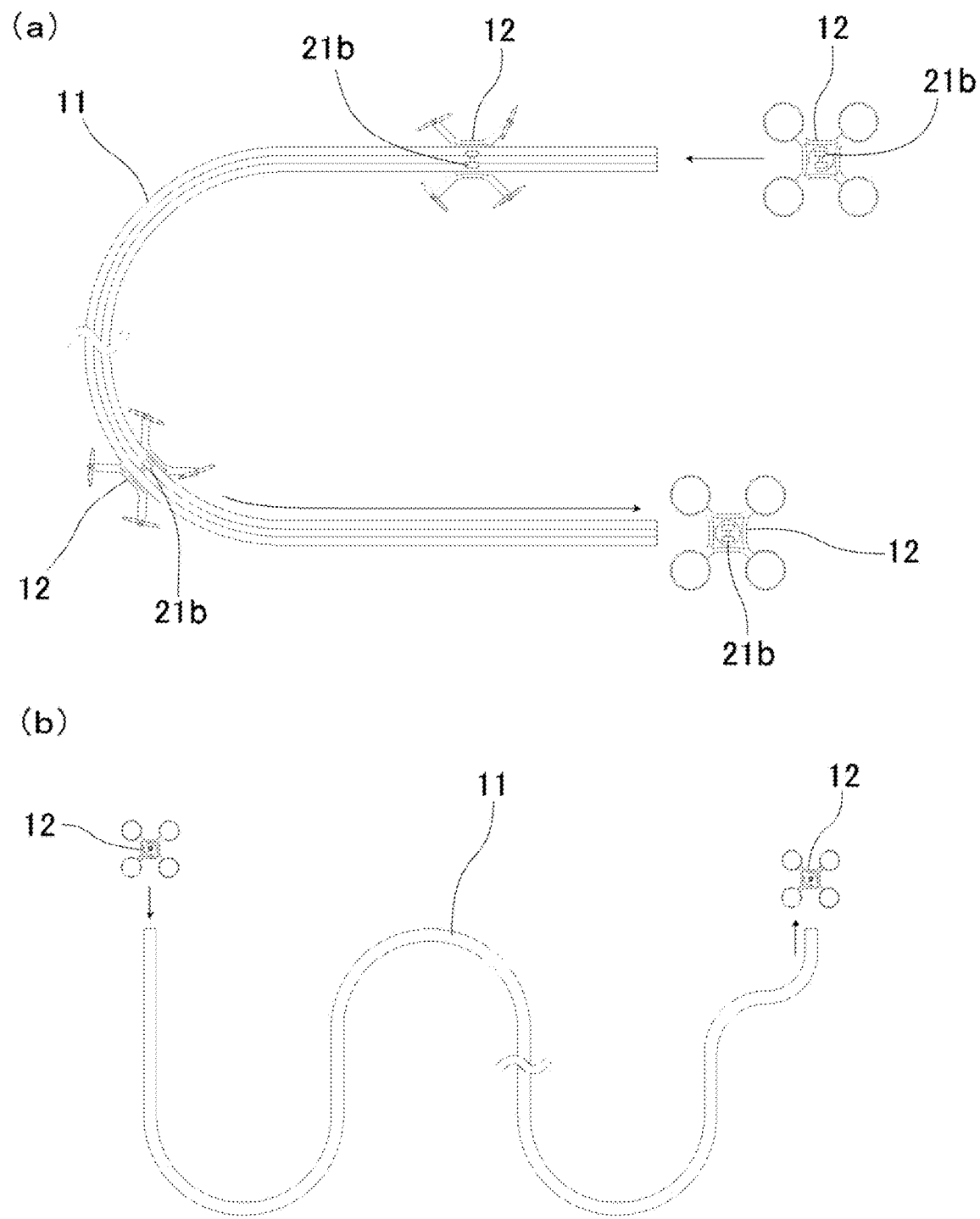
FIGS. 6A and 6B are plan views showing first and second modified examples, respectively, of the shape of the rail body of the aerial vehicle takeoff and landing system according to the embodiment of the present invention, in which the ceiling portion of the rail body is omitted.

As shown in FIG. 5, the rail body 11 may be arranged so as to form a downward inclination from one end portion toward the landing position. In this case, the aerial vehicle 12 having the engagement portion 21b inserted into the rail body 11 from one end side can be moved toward the landing position along the inclination of the rails 11a in a stopped state.

As shown in FIGS. 4 and 5, when the aerial vehicle 12 is automatically moved along the rail body 11, the aerial vehicle takeoff and landing system 10 may have a stopper provided at an arbitrary place of the rail body 11 so as to be able to temporarily stop the aerial vehicle 12. In this case, for example, luggage can be easily loaded and unloaded at the position of the stopper. As a result, for example, the rail body 11 can be attached to the ceiling of the corridor on each floor of a condominium, and a stopper can be provided in front of the door of each house so that the luggage can be unloaded in front of the door of each house.

The rail body 11 may be provided in a straight line in a plan view, but if the aerial vehicle 12 can move smoothly, the rail body 11 may be provided in any shape such as a U-shape, an S-shape, a meandering shape, or the like as shown in FIGS. 6A and 6B. Also in this case, the aerial vehicles 12 that land one after another can take off in order, and a plurality of aerial vehicles 12 can take off and land in succession.

Figure 7:
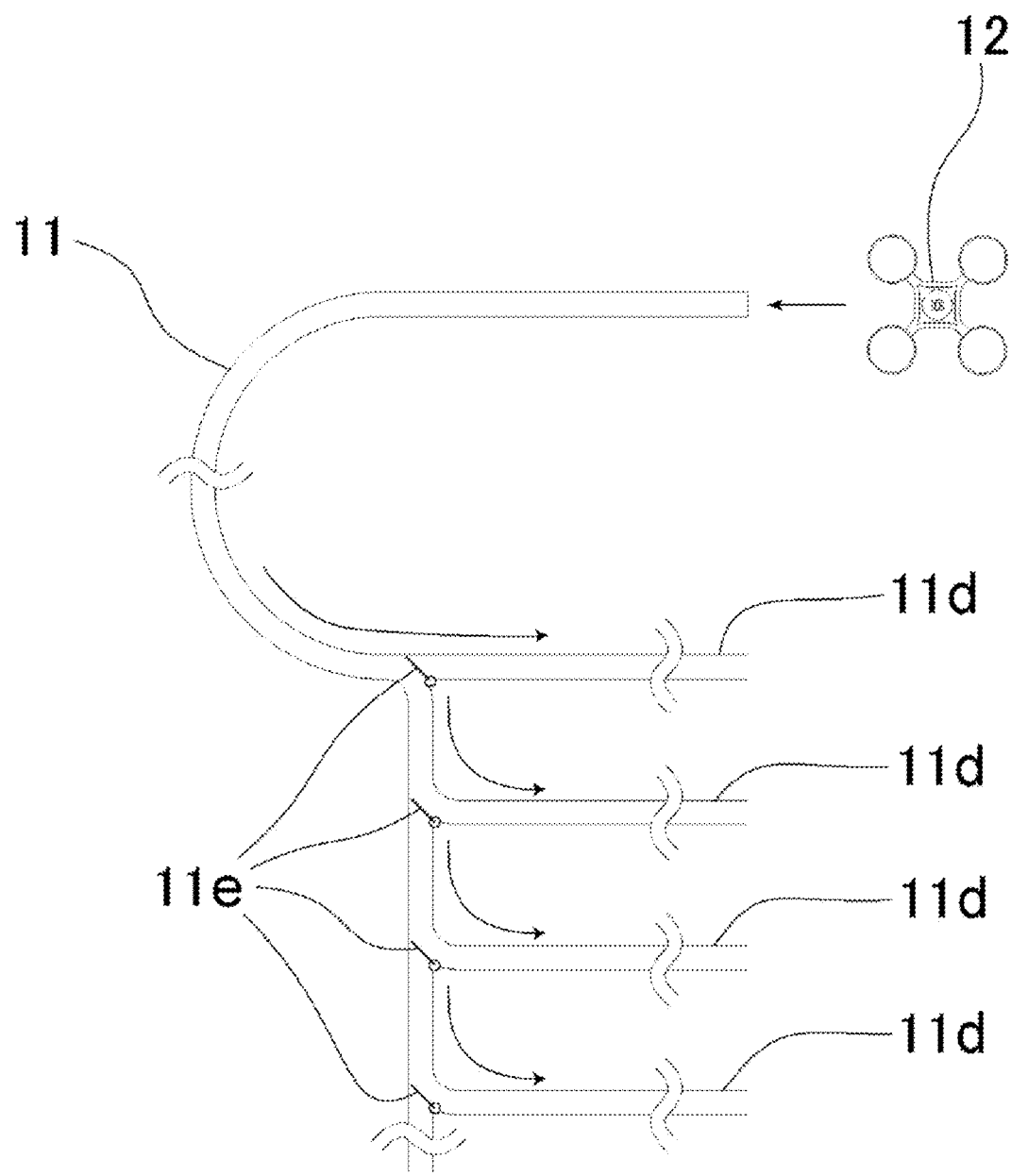
FIG. 7 is a plan view showing a modified example in which the rail body of the aerial vehicle takeoff and landing system according to the embodiment of the present invention is branched.
Figure 8:
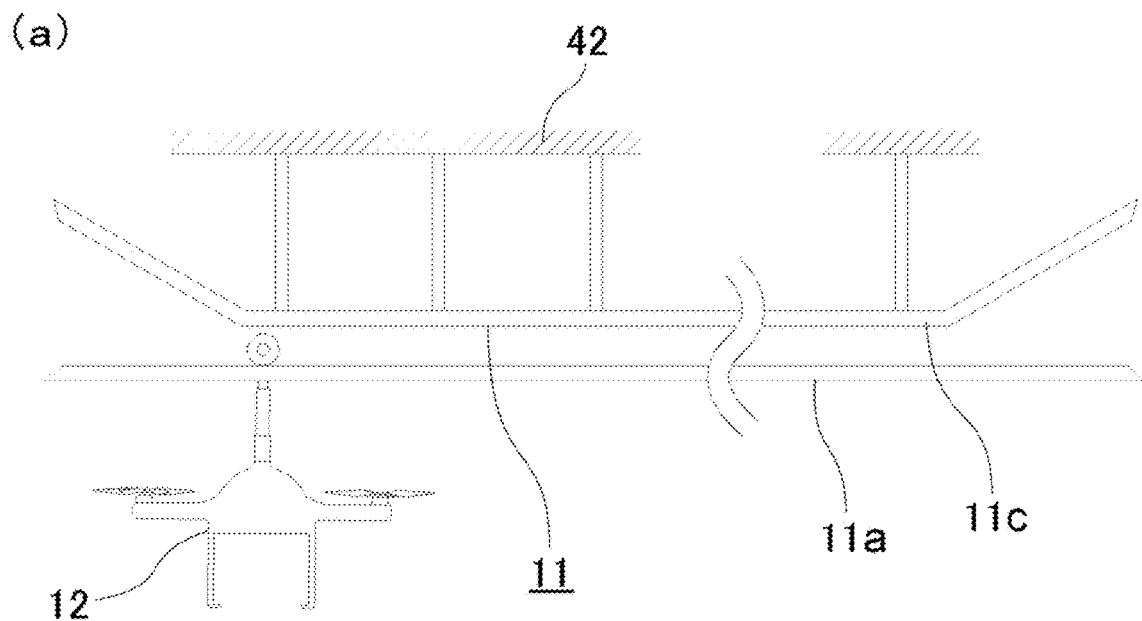
FIGS. 8A and 8B are side views showing modified examples in which the rail body is attached to the ceiling and the pole, respectively, of the aerial vehicle takeoff and landing system according to the embodiment of the present invention, in which the side wall of the rail body is omitted.
Figure 8:
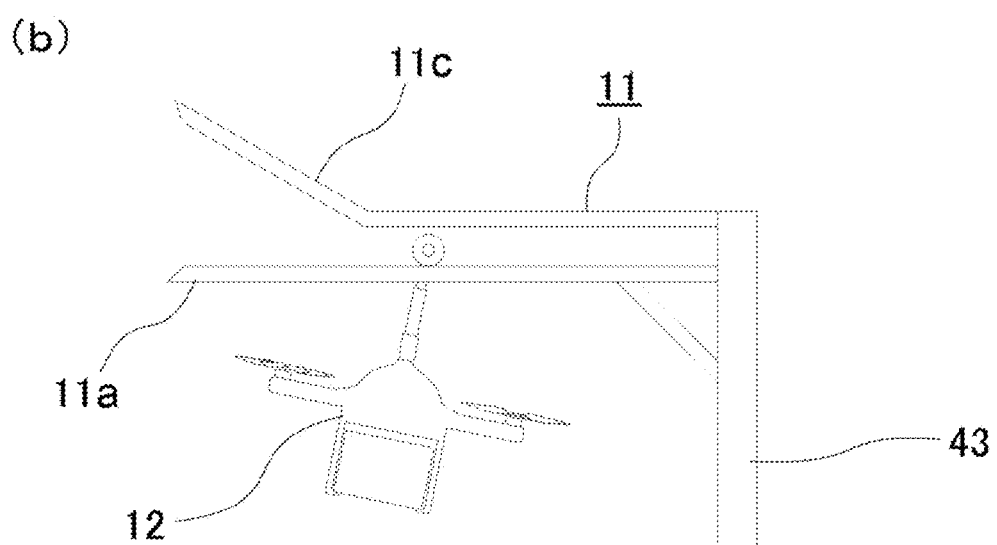
Figure 9:
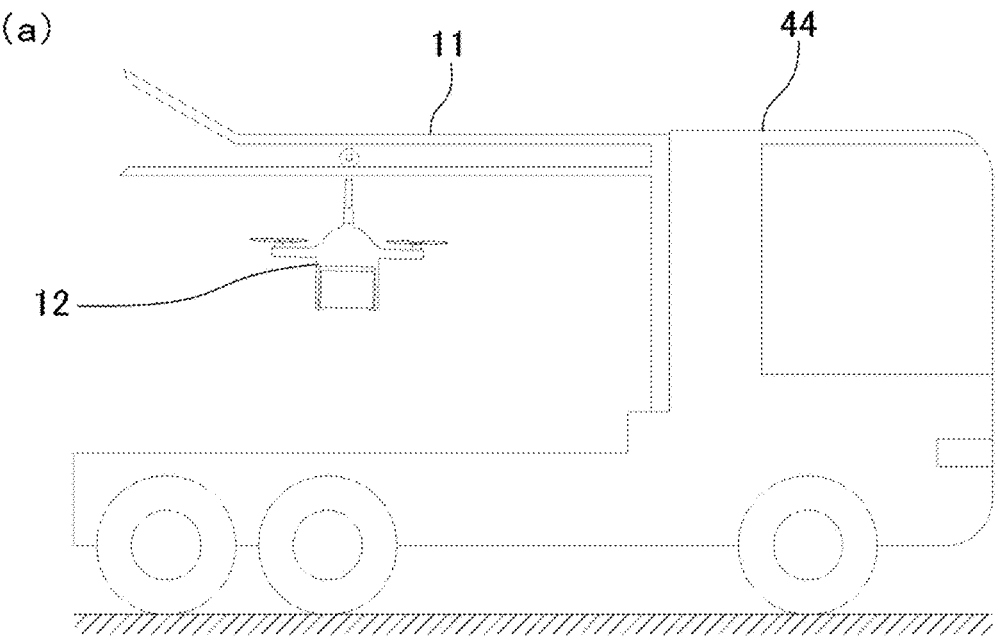
FIGS. 9A, 9B, and 9C are side views shows modified examples in which the rail body is attached to a land moving object, a water moving object, and an aerial moving object, respectively, of the aerial vehicle takeoff and landing system according to the embodiment of the present invention in which the side wall of the rail body is omitted.
Figure 9:
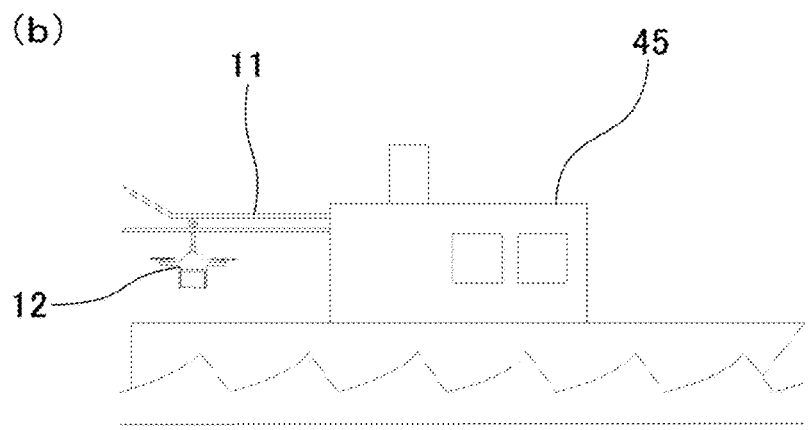
Figure 9:
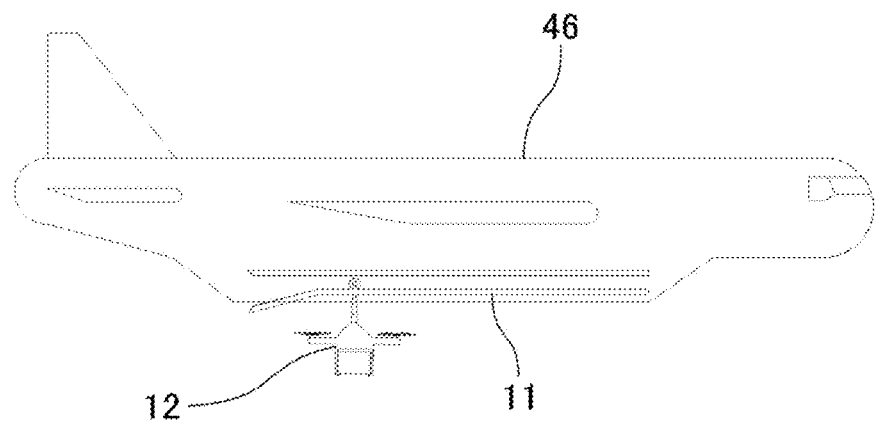
Figure 10:
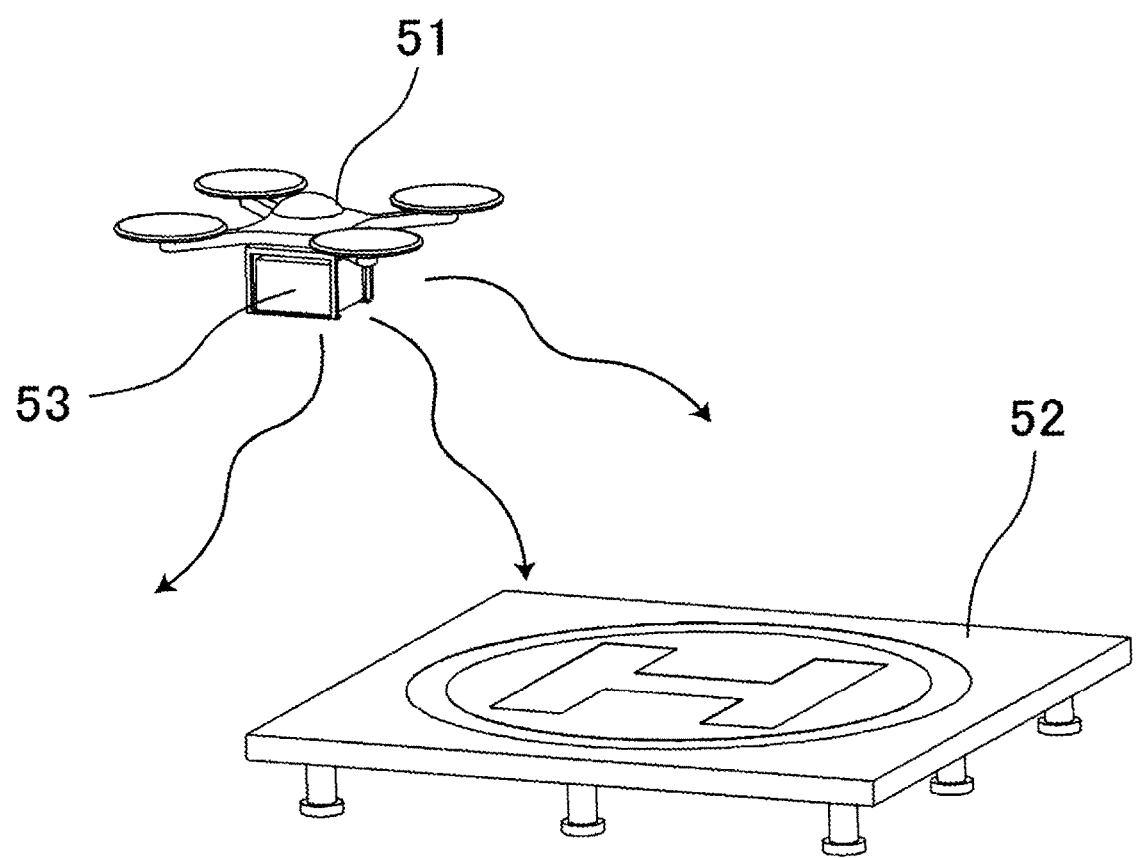
FIG. 10 is a perspective view showing a conventional aerial vehicle takeoff and landing system.

As shown in FIG. 7, the rail body 11 may be provided so as to branch halfway into a plurality of rail bodies 11. In this case, the branched rail bodies 11d can be assigned according to the contents of various work such as unloading the luggage from the aerial vehicle 12, attaching the luggage to the aerial vehicle 12, and maintenance work of the aerial vehicle 12. In order to guide the aerial vehicle 12 to a desired branch rail body 11d, a point switching means 11e that can be remotely controlled may be provided at the branch positions of the branch rail bodies 11d.

The rail body 11 may be installed on the ceiling 42, under the eaves, or the side wall of a factory, a house, a building, and the like, as shown in FIG. 8A, and the rail body 11 may be fixed to the upper portion of the pole 43 or suspended from above a crane or the like as shown in FIG. 8B. As shown in FIG. 9A, the rail body 11 may be provided on a land moving object 44 that moves on the ground such as an automobile. As shown in FIG. 9B, the rail body 11 may be provided on a water moving object 45 that moves on the water such as a ship or the like. As shown in FIG. 9C, the rail body 11 may be provided on an aerial moving object 46 that moves in the air such as a large drone, an airplane, or an airship.

The aerial vehicle takeoff and landing system according to the present invention can be used not only in an aerial vehicle but also in an underwater moving object body by installing the rails underwater, and can be extended as the takeoff and landing system thereof.

REFERENCE SIGNS LIST

10 Aerial vehicle takeoff and landing system
11 Rail body
11a Rail
11b Side wall
11c Ceiling portion
12 Aerial vehicle
21 Suspension portion
21a Arm
21b Engagement portion
31 Belt conveyor
32 Luggage
11d Branch rail body
11e Point switching means
41 Transport means
42 Ceiling
43 Pole
44 Land moving object
45 Water moving object
46 Aerial moving object
51 Aerial vehicle
52 Landing platform
53 Luggage

What is claimed is:

1. An aerial vehicle takeoff and landing system comprising:
  a pair of rails arranged side by side with a gap therebetween and arranged with a space in an extension direction on at least an under side and one end side; and
  an aerial vehicle having a suspension portion provided at an upper portion thereof so as to be inserted between the rails from the one end side, wherein
  with the suspension portion inserted between the rails, the aerial vehicle can be suspended at a predetermined landing position of the rails, and the aerial vehicle suspended at the landing position can take off.

2. The aerial vehicle takeoff and landing system according to claim 1, wherein
  the aerial vehicle suspended at the landing position is configured to be able to take off from the one end side.

3. The aerial vehicle takeoff and landing system according to claim 1, wherein
  the rails are also arranged with a space in the extension direction on the other end side, and
  the aerial vehicle suspended at the landing position is configured to be able to take off from the other end side.

4. The aerial vehicle takeoff and landing system according to claim 1, wherein
  the rails are arranged at intervals in a left-right direction.

5. The aerial vehicle takeoff and landing system according to claim 1, wherein
  the rails are provided so that a distance between the rails increases from the landing position toward the one end side.

6. The aerial vehicle takeoff and landing system according to claim 1, wherein
  the suspension portion has an arm provided so as to extend upward from the aerial vehicle and an engagement portion provided at a distal end of the arm so as to be movable in a state of being inserted between the rails and be able to engage between the rails at the landing position.

7. The aerial vehicle takeoff and landing system according to claim 6, wherein
  the arm is provided so as to be deformable between a protruding state of extending toward an upper side of the aerial vehicle and a retracted state in which an amount of protrusion toward the upper side from the aerial vehicle is smaller than that of the protruding state.

8. The aerial vehicle takeoff and landing system according to claim 1, wherein
  the aerial vehicle is provided so as to be able to fly by remote control or automatic control.

9. An aerial vehicle takeoff and landing apparatus for landing an aerial vehicle, comprising:
  a pair of rails arranged side by side with a gap therebetween and arranged with a space in an extension direction on at least an under side and one end side,
  the aerial vehicle having a suspension portion provided at an upper portion thereof so as to be inserted between the rails from the one end side, wherein
  with the suspension portion inserted between the rails, the aerial vehicle can be suspended at a predetermined landing position of the rails, and the aerial vehicle suspended at the landing position can take off.

10. The aerial vehicle aerial vehicle takeoff and landing apparatus according to claim 9, wherein
  the aerial vehicle suspended at the landing position is configured to be able to take off from the one end side.

11. The aerial vehicle takeoff and landing apparatus according to claim 9, wherein
  the rails are also arranged with a space in the extension direction on the other end side, and
  the aerial vehicle suspended at the landing position is configured to be able to take off from the other end side.

12. The aerial vehicle takeoff and landing apparatus according to claim 9, wherein
  the rails are arranged at intervals in a left-right direction.

13. The aerial vehicle takeoff and landing apparatus according to claim 9, wherein
  the rails are provided so that a distance between the rails increases from the landing position toward the one end side.

14. An aerial vehicle that takes off and lands using a pair of rails, comprising:
  a suspension portion at an upper portion thereof,
  the rails being arranged side by side with a gap therebetween and arranged with a space in an extension direction on at least an under side and one end side,
  the suspension portion being provided so as to be inserted between the rails from the one end side, wherein
  with the suspension portion inserted between the rails, the aerial vehicle can be suspended at a predetermined landing position of the rails, and the aerial vehicle suspended at the landing position can take off.

15. The aerial vehicle according to claim 14, wherein
the suspension portion has an arm provided so as to extend upward and an engagement portion provided at a distal end of the arm so as to be movable in a state of being inserted between the rails and be able to engage between the rails at the landing position.

16. The aerial vehicle according to claim 15, wherein
the arm is provided so as to be deformable between a protruding state of extending toward an upper side of the aerial vehicle and a retracted state in which an amount of protrusion toward the upper side from the aerial vehicle is smaller than that of the protruding state.

17. The aerial vehicle according to claim 14, wherein
the aerial vehicle is provided so as to be able to fly by remote control or automatic control.

* * * * *